May 3, 1927.

E. A. NELSON 1,627,336

SELF CLEANING DUMP BODY

Filed Nov. 8, 1926

Inventor

EMIL A. NELSON

By John G. ...
Attorney

Patented May 3, 1927.

1,627,336

UNITED STATES PATENT OFFICE.

EMIL A. NELSON, OF DETROIT, MICHIGAN.

SELF-CLEANING DUMP BODY.

Application filed November 8, 1926. Serial No. 147,062.

This invention relates to dump bodies for motor trucks and the like where moist sticky materials like clay or wet earth are handled, conveyed and dumped by gravity, the clinging or sticking of the material to the side walls of such devices usually delaying rapid unloading and complete clearing or cleaning of the conveying container.

The object of this invention is to provide a relatively simple means for clearing such containers by so shaping the interior thereof, that side wall clinging will be reduced to a minimum.

Other objects of the invention and features of novelty will be apparent from the following description taken in connection with the accompanying drawings, of which;

Figure 1:
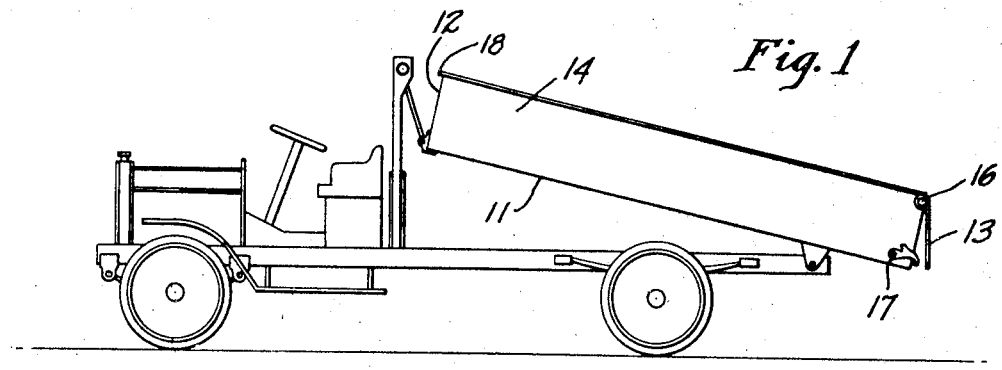
Fig. 1 depicts a conventional motor truck with its dump body partly elevated.

In the drawings I have illustrated a conventional conveying container to which my invention is applicable, and that is closely associated with modern excavation work, and which is normally subject to difficulties when handling clay, wet earth or similar sticky materials that are slightly fluid.

11 is the floor or bottom of a motor truck dump body, 12 is the front end wall and 13 is a swinging tail gate or load exit opening that may be of any conventional construction and operation. In this drawing, 16 is a cross hinge and 17 is a hook intended to hold the exit gate 13 closed until the operator is ready to dump the load and releases it. The loaded body is generally tilted as shown in Fig. 1 by some form of hoisting gear, until the angle of the body floor 11 to the ground is sufficient to slide the load out, whereupon the hook 17 is released, the gate 13 opens and the load slides out the exit thus provided.

Figure 2:
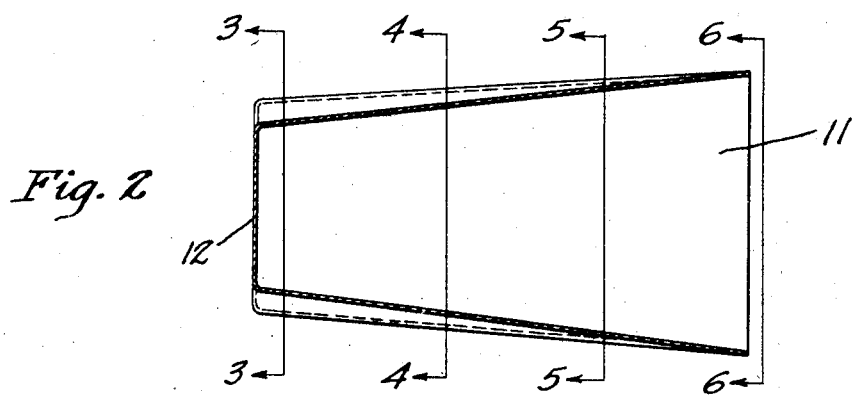
Fig. 2 is a plan view of the body shown in Fig. 1.

In Fig. 2 it will be noted that the floor 11 is not rectangular, but tapers in width from front to rear, thus permitting the load to spread or flow laterally as it moves toward the exit 13. This is important when the load is slightly fluid.

Figure 3:
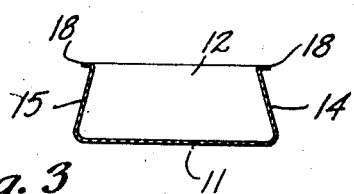
Fig. 3 is a transverse section of the dump body shown in Fig. 1 taken on line 3—3 of Fig. 2.
Figure 5:
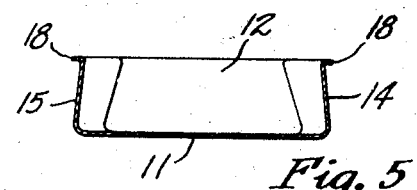
Fig. 5 is a transverse section thereof on the line 5—5 of Fig. 2.
Figure 4:
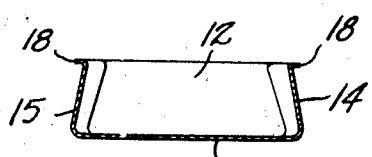
Fig. 4 is a transverse section thereof on the line 4—4 of Fig. 2.
Figure 6:
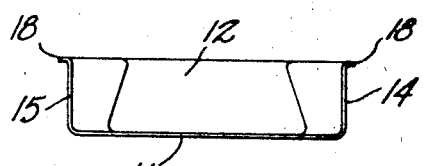
Fig. 6 is an end view thereof on the line 6—6 of Fig. 2.

In Fig. 3 the sidewalls 14 and 15 are inclined to the floor 11 by an angle much less than 90 degrees. In Fig. 4 the walls 14 and 15 are inclined to the floor 11 at a greater angle than in Fig. 3 but less than 90 degrees. In Fig. 5 the sidewalls 14 and 15 are inclined to the floor 11 at a greater angle than in Fig. 4 but less than 90 degrees, and in Fig. 6 the angle between the sidewalls 14 and 15 and the floor 11 has become approximately 90 degrees. It will be noted that the side walls 14 and 15 gradually and progressively approach a vertical relation to the floor 11 after starting from an acute angle thereto at the front end of the body. 18 is a flange that can be provided for stiffening the upper edge of the side and end walls 14, 15 and 12 when the body is made of sheet metal.

It will be quite evident that as the load moves rearward by gravity, down out of the tilted body, the cross sectional area of the body space is increasing whereas the cross sectional area of the moving load is decreasing, thus doubling the clearing or cleaning effect. Also, the moment the load starts moving, it loses contact with all the side walls and the only resistance to the flow is the floor friction, and any particles left clinging to the side walls 14 and 15 or the front wall 12 must depend on adhesion alone to remain.

This form of container tends to reduce the volumetric capacity for a given size of floor as compared to conventional form of similar containers, but there is nothing to limit the height of side wall of the motor truck dump body.

It will now be apparent that I have devised a new and useful construction in a very simple manner. Obviously changes can be made in detail by any one skillful in the art without departing from the spirit of the invention, and I do not care to limit myself to any particular type of conveying container.

What I claim is:

1. A self cleaning dump body having side walls inwardly inclined to the floor thereof by an amount increasingly approaching right angles from front to rear.

2. A self clearing dump body having an exit end and side walls, the side walls being positioned at right angles to the floor of the body at the exit end and the angle of the side walls to the floor of the body progressively decreasing from the exit to the other end.

3. A self clearing dump body having a floor, an end wall, side walls and an exit opening opposite the end wall, the said floor being of tapering form less in width at the end wall than at the exit opening, the side walls being positioned at right angles to the said floor at the exit opening and the angle of the side walls to the said floor progressively decreasing from the exit opening to the end wall.

EMIL A. NELSON.